(12) United States Patent
Beyda

(10) Patent No.: US 6,687,792 B2
(45) Date of Patent: Feb. 3, 2004

(54) METHOD AND SYSTEM FOR SELECTIVELY CACHING WEB ELEMENTS

(75) Inventor: William J. Beyda, Cupertino, CA (US)

(73) Assignee: Siemens Information & Communication Networks, Inc., Boca Raton, FL (US)

(*) Notice: Subject to any disclaimer, the term of this patent is extended or adjusted under 35 U.S.C. 154(b) by 11 days.

(21) Appl. No.: 09/965,362

(22) Filed: Sep. 27, 2001

(65) Prior Publication Data

US 2003/0061449 A1 Mar. 27, 2003

(51) Int. Cl.[7] .............................. G06F 12/00
(52) U.S. Cl. .................. 711/133; 711/118
(58) Field of Search .................. 711/133, 118, 711/134; 709/203; 707/200, 201, 203

(56) References Cited

U.S. PATENT DOCUMENTS 5,802,292 A    9/1998  Mogul ................ 709/203
6,085,193 A *  7/2000  Malkin ................ 707/10
6,128,701 A   10/2000  Malcolm et al. ........ 711/133
6,256,028 B1 * 7/2001  Sanford .............. 345/353
6,272,598 B1   8/2001  Arlitt et al. ........ 711/133

OTHER PUBLICATIONS

"Caching Tutorial for Web Authors and Webmasters", Jun. 19, 2000, Version 1.32.
"Web Caching Architecture", Mar. 20, 1997.

* cited by examiner

Primary Examiner—Kimberly Mclean-Mayo

(57) ABSTRACT

The present method for selective web caching comprises the steps of generating a table, the table comprising a URL, a time of last access and a time stamp of a web page, the table further comprising a URL, time of last access and time stamp of elements found on the web page; when a request for a web page is made, checking the requested web page's URL and time stamp and URL and time stamp of the requested web page's corresponding elements with the URL and time stamp listed in the table to determine whether any modification has been made; and selectively downloading in a cache only those elements which are deemed to have been modified.

29 Claims, 2 Drawing Sheets

TABLE

| URL | Last Access Time | Time Stamp |
|---|---|---|
| www.cnn.com ~30 | $t_1$ ~32 | $t_2$ ~34 |
| www.cnn.com/graphic.jpg1 ~36 | $t_3$ | $t_4$ |
| www.cnn.com/graphic.jpg2 ~38 | $t_5$ | $t_6$ |
| www.cnn.com/graphic.jpg3 ~40 | $t_7$ | $t_8$ |
| www.cnn.com/audio ~42 | $t_9$ | $t_{10}$ |

FIG. 2

METHOD AND SYSTEM FOR SELECTIVELY CACHING WEB ELEMENTS

FIELD OF INVENTION

The present invention relates generally to Internet/Intranet network systems, and in particular, to web caching where individual elements of a web page are selectively cached.

BACKGROUND OF THE INVENTION

Web caching is generally well known to those skilled in the art. Generally, a web cache sits between web servers (or remote servers) and a client and watches requests for HTML pages, images and files (known as objects) as they come by, saving a copy for itself. Typically, the web cache resides in a proxy server that sits in a local server. Then if there is another request for the same object, it will use the copy that it has, instead of asking the remote server for it again.

There are two main reasons for using web caches. One is to reduce latency. Because the request is satisfied from the cache (which is closer to the client) instead of the remote server, it takes less time for the client to get the object and display it. This makes web sites seem more responsive. The second reason is to reduce traffic. Because each object is only gotten from the server once, it reduces the amount of bandwidth used by a client. This saves money if the client is paying based on traffic, and keeps their bandwidth requirements lower and more manageable.

Generally, there are two types of web caches browser caches and proxy caches. The browser cache works by setting a section of a computer's hard disk to store objects. The browser cache works according to fairly simple rules. It will check to make sure that the objects are fresh, usually once a session. Proxy cache, while it works on a similar principle, is usually located in a local server, a gateway, or a router and can be shared by a number of clients.

All caches have a set of rules that they use to determine when to serve an object from the cache if it's available. Some of these rules are set by the HTTP protocols and, some are set by the administrator of the cache. (For a full discussion of above, see *Caching Tutorial for web Authors and webmasters* by Mark Nottingham).

A number of cache replacement strategies are currently suggested as an attempt to optimally reduce latency and/or traffic. For instance, U.S. Pat. No. 6,272,598 describes a cache system that includes a storage that is partitioned into a plurality of storage areas. Each storage area stores one kind of object received from remote sites. The cache system further includes a cache manager which causes objects to be stored in the corresponding storage areas of the storage. The cache manager causes cached objects in each of the storage areas to be replaced in accordance with one of a plurality of replacement policies, each being optimized for one kind of objects.

In another example, the U.S. Pat. No. 6,128,701 describes a system for automatically refreshing documents in a cache, so that each particular document is refreshed no more often and no less often than needed. For each document, the cache estimates a probability distribution of times for client requests for that document and a probability distribution of times for server changes to that document. Times for refresh are selected for each particular document in response to both the estimated probability distribution of times for client requests and the estimated probability distribution of times for server changes.

Yet in another example, the U.S. Pat. No. 5,802,292 describes a method for predictive pre-fetching of objects over a computer network which includes the steps of providing a client computer system, providing a server computer system, a network link to the client computer system, requesting from the server computer system by the client computer system a retrieval of a plurality of objects, retrieving the plurality of objects by the server system, storing the retrieval and an identity of the client computer system in the memory of the server computer system, sending the plurality of objects from the server computer system to the client computer system over the network link, predicting in the server computer system a subsequent retrieval request from the client computer system according to a predetermined criteria, sending the prediction to the client computer system, and pre-fetching by the client computer system an object based on the prediction and other information.

In general, however, a conventional caching method being employed is one where a table keeps track of the requested web page URL (Universal Resource Locator), the time it was last used, and the time stamp of the page. If the table can hold one hundred entries, for instance, then the last hundred web pages visited by the server client using this cache will still be cached locally. If a page is not found in the local cache, the hundredth page is removed from the table, and the URL of the new page is added to the top of the table. If a page is found in the local cache, the cache requests a new page from the remote server, checks the time stamp, and if it is the same as the time stamp of the web page found in the table, stops the transfer and delivers the web page already cached. If the time stamp is different, however, the page is reloaded into the cache and is delivered to the client.

In this prior art method the local server only keeps track of the time stamp of the web page. A web page, however, is typically composed of many elements or objects, such as text files, graphic files, audio files, and video files. Each of these elements or objects has a unique URL and a time stamp, and can be downloaded independently of each other. However, the conventional caching method does not keep track of these individual elements. Consequently, a decision to use a cached web page is an "all or nothing" deal. Even if only a component, e.g. a graphic file, has changed on a web page, the entire web page is requested from a remote server. Consequently, all of the elements that make up the web page need to be sent again. A significant reduction in latency and/or traffic may be achieved by keeping track of the time stamp of the individual elements of a web page as well as the time stamp of the web page itself, and only requesting those elements which have undergone a change. However, this type of replacement strategy is not available in the current cache systems.

SUMMARY OF THE INVENTION

The present method of caching therefore provides a way for selectively caching web elements in a client/server Internet/Intranet network environment. The method comprises the steps of generating a table, the table comprising a URL, a time of last access and a time stamp of a web page, the table further comprising a URL, time of last access and time stamp of elements found on the web page; when a request for a web page is made, checking the requested web page's URL and time stamp and URL and time stamp of the requested web page's corresponding elements with the URL and time stamp listed in the table to determine whether any modification has been made; and selectively downloading in a cache only those elements which are deemed to have been modified.

In another embodiment, the method comprises the steps of generating a table, the table comprising a URL, a time of last access and a time stamp of a web page, the table further comprising a URL, time of last access and time stamp of elements found on the web page; when a request for a web page is made, checking the requested web page's URL and time stamp with the table to determine whether any modification has been made to the web page, said requested web page containing a plurality of elements; downloading the requested web page but interrupting the download before the elements are downloaded; checking the elements' URL and time stamp with the table to determine whether any modification has been made to any of the elements; and selectively downloading into a cache only those elements which are deemed to have been modified.

BRIEF DESCRIPTION OF THE DRAWINGS

FIG. 2 illustrates a table used by the current cache system to keep track of the URL, time of last access, and time stamp of web pages and the elements that make up the web pages.

DETAILED DESCRIPTION OF THE INVENTION

Figure 1:
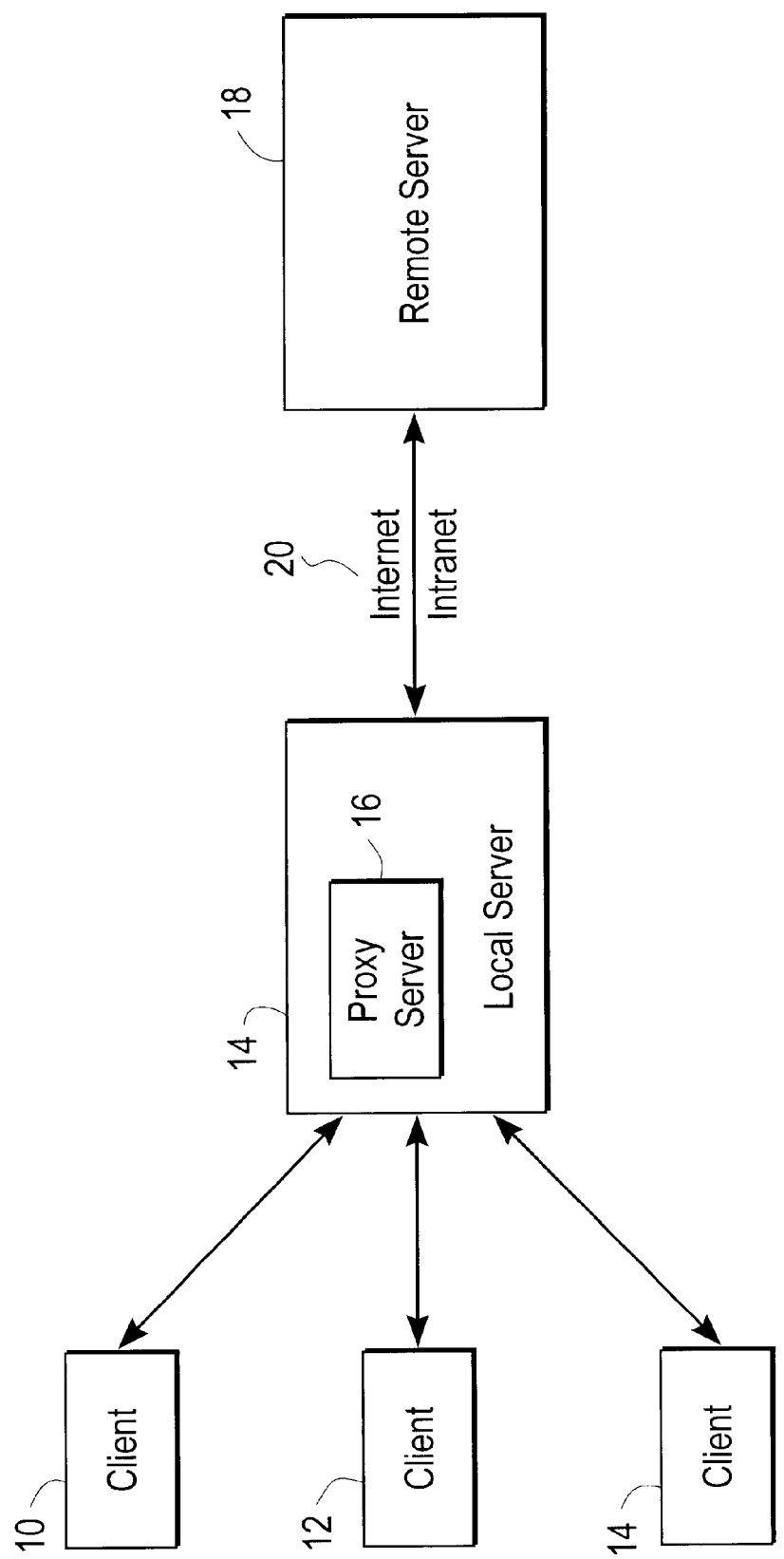
FIG. 1 illustrates an Internet/Intranet network system in which the present method of selective caching of web elements may be employed.

FIG. 1 illustrates a typical client/server Internet/Intranet network environment where the present method of selective caching of web elements may be employed. As illustrated, FIG. 1 shows a plurality of clients 10, 12, 14 connected to a local server 14. The local server 14 houses a proxy server 16 where caching is accomplished. The web cache is shared by all of the clients. The local server 14 is connected to Internet or Intranet 20 and can receive from a remote server 18 various documents or objects such as web pages, graphic files, audio files, etc. Although here the proxy server 16 was shown to be in the local server 14, it should be understood that it may be found in other devices such as a router or a gateway.

In the present invention, a table as shown in FIG. 2 is created in the proxy server 16. As illustrated, this table keeps track of URLs of all web pages that are requested by any of the clients 10, 12, and 14. For each of the URLs listed, the table keeps the time the last client accessed the web page, and the corresponding modification time stamp of when the page was last modified. This modification time stamp, hereinafter referred to as simply the "time stamp", refers to the last time something changed in the content at this particular URL. As an example, assuming that a client has requested the web page having the URL www.cnn.com, the table in FIG. 2 includes the URL "www.cnn.com" 30, the time 32 any client served by this cache last accessed the web page, and the page's own corresponding time stamp 34, indicating when anything on it was last modified. Assuming for this example that the web page having the URL "www.cnn.com" has three graphic files and an audio file, the URLs of each of the graphic files and audio file is also listed under the main web page as sub-entries. Here, the graphic files have the URL, "www.cnn.com/graphic.jpg1", 36, "www.cnn.com/graphic.jpg2" 38, and "www.cnn.com/graphic.jpg1", 40. The audio file has the URL, "www.cnn.com/audio" 42. For each of the URLs of the sub-entry URLs, the corresponding last-access time and time stamp are also listed.

Of course, in reality, the table will contain multiple URLs and their corresponding sub-entries. How many URLs and sub-entries are allowed depends on the size of the cache and can vary from system to system. If the table is already full, then the most recently requested web page URL which is not already found in the table will be placed into the table, and the "oldest" web page URL will be removed from the table, based on the oldest "access" time entries in the table.

When a client sends a request to the local server 14 for a web page, the URL of the requested web page is searched in the table as shown in FIG. 2. If the requested URL is not found, then the local server 14 directs the request to the remote server 18 via the Internet/Intranet 20. Once the remote server 18 receives the request, it directs a response with the requested web page to the client 10 via the local server 14. During this process, the requested web page is also cached in the proxy server 16 of the local server 14, and the corresponding details, i.e. URLs, time and time stamp, are captured in the table of FIG. 2.

If, on the other hand, the URL is found in the table of FIG. 2, the local server 14 sends the request to the remote server 18 and checks the time stamp of the requested web page. If the time stamp of the web page from the remote server 18 matches the time stamp in the table, then the local server 14 stops the transfer, and delivers to the client the web page already cached in the proxy server 16. If, on the other hand, the time stamp is different, the local server allows the download of the main part of the web page (the shell without the elements), but interrupting it as soon as the shell is complete. The local server 14 then checks the URLs of each of the elements belonging to the web page. If a matching URL is not found, then the local server 14 deems that the element has changed and downloads the element to local server 14. If a matching URL is found, then the local server 14 checks the time stamp of the element and matches with the table. If a match is found, then that element is not deemed to be new, and element found in the cache is used. If a match is not found, however, then the local server 14 deems that a change has occurred, and initiates the download of the changed element. Of course, whenever a new element is downloaded, the table is updated such that the URL of the element and its last access time and time stamp replace the outdated information in the table. As the elements are downloaded to the local server 14, they are in turn passed on to the client 10. It is not necessary to wait until all elements have been verified and downloaded to the server 14 before beginning the transfer of elements on to the client 10.

Although generally the cache will be refreshed when the user makes a specific request, it may be refreshed at a periodic interval if spare bandwidth is available. The refreshing process is essentially the same as described above. Essentially, the local server 14 initiates the download of the web page to be refreshed, but interrupting it as soon as the shell is complete. The local server 14 then checks the URLs of each of the elements belonging to the web page. If a matching URL is not found, then the local server 14 deems that the element has changed and downloads the element to local server 14 and storing it in the cache. If a matching URL is found, then the local server 14 checks the time stamp of the element and matches with the table. If a match is found, then that element is not deemed to be new, and no downloading is initiated. If a match is not found, however, then the local server 14 deems that a change has occurred, and initiates the download of the changed element. Of course, whenever a new element is downloaded, the table is updated such that the URL of the element and its last access time and time stamp replace the outdated information in the table.

In displaying a web page which has been selectively cached, it is possible and perhaps sometimes beneficial to display first those elements which are found and readily available in the cache, but with a message that the modified elements are being downloaded. The modified elements are then subsequently displayed as they are downloaded.

The present method of selective caching of web elements can greatly reduce latency and/or traffic in a network environment by allowing only the modified elements to be downloaded from the remote server rather than the entire web page. Having described a preferred embodiment of this method, it will now become apparent to those skilled in the art that other embodiments incorporating its concepts may be provided. This invention, therefore, should not be limited to the disclosed invention, but should be limited only by the spirit and scope of the appended claims.

What claimed is:

1. In a client/server Internet/Intranet network environment, a method of caching comprising:

generating a table, said table comprising a URL, a time of last access and a time stamp of a web page, said table further comprising a URL, time of last access and time stamp of elements found on the web page;

when a request for a web page is made, checking the requested web page's URL and time stamp and URL and time stamp of the requested web page's corresponding elements with the URL and time stamp listed in the table to determine whether any modification has been made; and selectively downloading in a cache only those elements which are deemed to have been modified.

2. The method of caching as recited in claim 1 further comprising:

updating the table such that the URL of the downloaded elements and their corresponding last access time and time stamp replace outdated information in the table.

3. The method of caching as recited in claim 1 wherein the requested web page is deemed to have been modified if the time stamp of the requested web page does not match with the time stamp in the table.

4. The method of caching as recited in claim 1 wherein an element is deemed to have been modified if the time stamp of the element does not match with the time stamp in the table.

5. The method of caching as recited in claim 1 wherein an element of a web page is deemed to have been modified if the URL of the web page is found in the table but URL of the corresponding element is not found in the table.

6. The method of caching as recited in claim 2 wherein the requested web page is deemed to have been modified if the time stamp of the requested web page does not match with the time stamp in the table.

7. The method of caching as recited in claim 2 wherein an element is deemed to have been modified if the time stamp of the element does not match with the time stamp in the table.

8. The method of caching as recited in claim 2 wherein an element of a web page is deemed to have been modified if the URL of the web page is found in the table but URL of the corresponding element is not found in the table.

9. In a client/server Internet/Intranet network environment, a method of caching comprising:

generating a table, said table comprising a URL, a time of last access and a time stamp of a web page, said table further comprising a URL, time of last access and time stamp of elements found on the web page;

when a request for a web page is made, checking the requested web page's URL and time stamp with the table to determine whether any modification has been made to the web page, said requested web page containing a plurality of elements;

downloading the requested web page but interrupting the download before the elements are downloaded;

checking the elements' URL and time stamp with the table to determine whether any modification has been made to any of the elements; and selectively downloading into a cache only those elements which are deemed to have been modified.

10. The method of caching as recited in claim 9 further comprising:

updating the table such that the URL of the downloaded elements and their corresponding last access time and time stamp replace outdated information in the table.

11. The method of caching as recited in claim 9 wherein the requested web page is deemed to have been modified if the time stamp of the requested web page does not match with the time stamp in the table.

12. The method of caching as recited in claim 9 wherein an element is deemed to have been modified if the time stamp of the element does not match with the time stamp in the table.

13. The method of caching as recited in claim 9 wherein an element of a web page is deemed to have been modified if the URL of the web page is found in the table but URL of the element is not found in the table.

14. The method of caching as recited in claim 10 wherein a web page is deemed to have been modified if the time stamp of the requested web page does not match with the time stamp in the table.

15. The method of caching as recited in claim 10 wherein an element is deemed to have been modified if the time stamp of the element does not match with the time stamp in the table.

16. The method of caching as recited in claim 10 wherein an element of a web page is deemed to have been modified if the URL of the web page is found in the table but URL of the corresponding element is not found in the table.

17. In a client/server Internet/Intranet network environment, a method of caching comprising:

generating a table, said table comprising a URL, a time of last access and a time stamp of a web page, said table further comprising a URL, time of last access and time stamp of elements found on the web page;

checking periodically the requested web page's URL and time stamp and URL and time stamp of the requested web page's corresponding elements with the URL and time stamp listed in the table to determine whether any modification has been made; and selectively downloading in a cache only those elements which are deemed to have been modified.

18. The method of caching as recited in claim 17 further comprising:

updating the table such that the URL of the downloaded elements and their corresponding last access time and time stamp replace outdated information in the table.

19. The method of caching as recited in claim 17 wherein the requested web page is deemed to have been modified if the time stamp of the requested web page does not match with the time stamp in the table.

20. The method of caching as recited in claim 17 wherein an element is deemed to have been modified if the time stamp of the element does not match with the time stamp in the table.

21. The method of caching as recited in claim 17 wherein an element of a web page is deemed to have been modified if the URL of the web page is found in the table but URL of the corresponding element is not found in the table.

22. A system for caching comprising:
   a table, said table comprising a URL, a time of last access and a time stamp of a web page, said table further comprising a URL, time of last access and time stamp of elements found on the web page;
   a mechanism for checking a requested web page's URL and time stamp and URL and time stamp of the requested web page's corresponding elements with the URL and time stamp listed in the table to determine whether any modification has been made; and
   a mechanism for selectively downloading in a cache only those elements which are deemed to have been modified.

23. The system for caching as recited in claim 22 further comprising:
   a mechanism for updating the table such that the URL of the downloaded elements and their corresponding last access time and time stamp replace outdated information in the table.

24. The system for caching as recited in claim 22 wherein the requested web page is deemed to have been modified if the time stamp of the requested web page does not match with the time stamp in the table.

25. The system for caching as recited in claim 22 wherein an element is deemed to have been modified if the time stamp of the element does not match with the time stamp in the table.

26. The system for caching as recited in claim 22 wherein an element of a web page is deemed to have been modified if the URL of the web page is found in the table but URL of the corresponding element is not found in the table.

27. The system for caching as recited in claim 23 wherein the requested web page is deemed to have been modified if the time stamp of the requested web page does not match with the time stamp in the table.

28. The system for caching as recited in claim 23 wherein an element is deemed to have been modified if the time stamp of the element does not match with the time stamp in the table.

29. The system for caching as recited in claim 23 wherein an element of a web page is deemed to have been modified if the URL of the web page is found in the table but URL of the corresponding element is not found in the table.

\* \* \* \* \*